US008670515B2

(12) United States Patent
Roslund et al.

(10) Patent No.: US 8,670,515 B2
(45) Date of Patent: Mar. 11, 2014

(54) DIGITAL NUCLEAR CONTROL ROD CONTROL SYSTEM

(75) Inventors: Charles J. Roslund, Murrysville, PA (US); Louis G. Ottobre, Murrysville, PA (US); Christopher P. Meier, Export, PA (US); Jonathan E. Baisch, Export, PA (US); Jay B. Metha, Monroeville, PA (US); Fred H. Bednar, Pittsburgh, PA (US); Rololfo I. Pinal, Pittsburgh, PA (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 948 days.

(21) Appl. No.: 12/792,834

(22) Filed: Jun. 3, 2010

(65) Prior Publication Data

US 2011/0026660 A1   Feb. 3, 2011

Related U.S. Application Data

(60) Provisional application No. 61/229,460, filed on Jul. 29, 2009.

(51) Int. Cl.
G21C 7/06   (2006.01)

(52) U.S. Cl.
USPC ............................ 376/228; 376/207; 376/219

(58) Field of Classification Search
USPC ......... 376/207, 215, 219, 227, 228, 236, 237, 376/239, 240
See application file for complete search history.

(56) References Cited

U.S. PATENT DOCUMENTS

| 3,158,766 | A |   | 11/1964 | Frisch |
|---|---|---|---|---|
| 3,480,807 | A |   | 11/1969 | Downs et al. |
| 3,959,071 | A |   | 5/1976 | Bevilacqua |
| 3,992,255 | A |   | 11/1976 | DeWesse |
| 4,663,576 | A |   | 5/1987 | Scarola et al. |
| 4,717,528 | A | * | 1/1988 | Meyer et al. .................. 376/237 |
| 5,059,382 | A |   | 10/1991 | Jahnke et al. |
| 5,076,996 | A |   | 12/1991 | Miyaguchi et al. |
| 5,963,610 | A | * | 10/1999 | Falvo et al. .................. 376/259 |
| 5,999,583 | A |   | 12/1999 | Pysnik et al. |
| 2003/0128792 | A1 |   | 7/2003 | Ishii et al. |
| 2009/0116605 | A1 |   | 5/2009 | Pouillot et al. |
| 2009/0252272 | A1 |   | 10/2009 | Hashemian et al. |

FOREIGN PATENT DOCUMENTS

| JP | S5999289 | 6/1984 |
|---|---|---|
| JP | S5999292 | 6/1984 |
| JP | H0454492 | 2/1992 |
| JP | H11194191 | 7/1999 |
| JP | 2005156459 | 6/2005 |
| JP | 2007198954 | 8/2007 |

* cited by examiner

Primary Examiner — Jack W Keith
Assistant Examiner — Marshall O'Connor
(74) Attorney, Agent, or Firm — Richard J. Coldren; Westinghouse Electric Company LLC

(57) ABSTRACT

A digital rod control system that employs separate power modules to energize the respective coils of a magnetic jack control rod drive rod drive system so that two, independently powered grippers can simultaneously support the control rod drive rod when it is not in motion to avoid dropped rods. The basic building block of the system is two or more selecting cabinets which receive multiplex power from at least one moving cabinet and are under the control of a single logic cabinet. Each of the cabinets include monitoring features to confirm the reliability of the system.

18 Claims, 11 Drawing Sheets

DIGITAL NUCLEAR CONTROL ROD CONTROL SYSTEM

CROSS REFERENCE TO RELATED APPLICATIONS

This application claims priority to Provisional Application Ser. No. 61/229,460, filed Jul. 29, 2009, entitled DIGITAL ROD CONTROL SYSTEM.

BACKGROUND OF THE INVENTION

1. Field of the Invention

This invention relates in general to nuclear reactor control systems and, in particular, to systems for controlling the movement of nuclear control rods into and out of the core of a nuclear reactor.

2. Description of the Prior Art

In a nuclear reactor for power generation, such as a pressurized water reactor, heat is generated by fission of a nuclear fuel such as enriched uranium, and transferred into a coolant flowing through a reactor core. The core contains elongated nuclear fuel rods mounted in proximity with one another in a fuel assembly structure through and over which the coolant flows. The fuel rods are spaced from one another in coextensive parallel arrays. Some of the neutrons and other atomic particles released during nuclear decay of fuel atoms in a given fuel rod pass through the spaces between fuel rods and impinge on the fissile material in an adjacent fuel rod, contributing to the nuclear reaction and to the heat generated by the core.

Moveable control rods are dispersed throughout the nuclear core to enable control of the overall rate of fission, by absorbing a portion of the neutrons passing between fuel rods, which otherwise would contribute to the fission reaction. The control rods generally comprise elongated rods of neutron absorbing material and fit into longitudinal openings or guide thimbles in the fuel assemblies running parallel and between the fuel rods. Inserting a control rod further into the core causes more neutrons to be absorbed without contributing to fission in an adjacent fuel rod; and retracting the control rod reduces the extent of neutron absorption and increases the rate of the nuclear reaction and the power output of the core.

The control rods are supported in cluster assemblies that are moveable to advance or retract a group of control rods relative to the core. For this purpose, control rod drive mechanisms are provided, typically as part of an upper internals arrangement located within the nuclear reactor vessel above the nuclear core. The reactor vessel is typically pressurized to a high internal pressure, and the control rod drive mechanisms are housed in pressure housings that are tubular extensions of the reactor pressure vessel. FIG. 1 is a schematic view of a prior art nuclear containment 10 housing a reactor pressure vessel 12 having a nuclear core 14 supported within the lower half of the pressure vessel 12. A control rod assembly 16 is shown within the core 14 and supports a cluster of control rods 18 that are moved into and out of the fuel assemblies (not shown) by a drive rod 20. The drive rod 20 is moveably supported by a drive rod housing 24 that extends upwardly and through a removable reactor closure head 22. Control rod drive mechanisms (CRDM) are positioned above the reactor head around the control rod drive rod housing 24 and moves the drive rods in a vertical direction to either insert or withdraw the control rods 18 from the fuel assemblies within the core 14. Rod position indicator coils 26 or other indicator mechanisms are positioned around the housing 24 to track the position of the drive rod 20, and thus the control rods 18 relative to the core 14. The output of the rod position indicator coils 26 is fed through a processor rod position indicator (RPI) electronics cabinet 28 within the containment 10. The output of the rod position indicator electronics cabinet 28 is then fed outside the containment to a logic cabinet 30 and an RPI processing unit 32. The logic cabinet 30 interfaces with the reactor control system 34 which provides manual instructions from a user interface 36 as well as automatic instructions which it generates from the intelligence from plant sensors not shown. The logic cabinet 30 receives manual demand signals from an operator through a user interface 36 and reactor control system 34 or automatic demand signals from the reactor control system 34 and provides the command signals needed to operate the control rods 18 according to a predetermined schedule. The power cabinet 38 provides a programmed current to operate the CRDM, all in a well-known manner.

One type of mechanism for positioning a control rod assembly 16 is a magnetic jack-type mechanism, operable to move the control rod drive rod by an incremental distance into or out of the core in discrete steps. In one embodiment, the control rod drive mechanism has three electromagnetic coils and armatures or plungers that are operated in a coordinated manner to raise and lower a drive rod shaft 20 and a control rod cluster assembly 16 coupled to the shaft 20. The three coils (CRDM) are mounted around and outside the pressure housing 24. Two of the three coils operate grippers that when powered by the coils engage the drive rod shaft, with one or the grippers being axially stationary and the other axially moveable.

The drive rod shaft has axially spaced circumferential grooves that are clasped by latches on the grippers, spaced circumferentially around the drive rod shaft. The third coil actuates a lift plunger coupled between the moveable gripper and a fixed point. If power to the control rod mechanism is lost, the two grippers both release and the control rods drop by gravity into their maximum nuclear flux damping position. So long as control power remains activated, at least one of the stationary gripper and the moveable gripper holds the drive rod shaft at all times.

The three coils are operated in a timed and coordinated manner alternately to hold and to move the drive shaft. The sequence of gripping actions and movement is different depending on whether the step-wise movement is a retraction or an advance. The stationary gripper and the moveable gripper operate substantially, alternately, although during the sequence of movements both grippers engage the drive shaft during a change from holding stationary to movement for advance or retraction. The stationary gripper can hold the drive shaft while the moveable gripper is moved to a new position of engagement, for lowering (advancing) the drive shaft and the control rods. The moveable grippers engage the drive shaft when moving it up or down as controlled by the lift plunger. After the moveable gripper engages the drive shaft, the stationary gripper is released and then the plunger is activated or deactivated to effect movement in one direction or the other. Typically, each jacking or stepping movement moves the drive rod shaft ⅝ inch (1.6 cm), and some 228 steps are taken at about 0.8 seconds per step, to move a control rod cluster over its full span of positions between the bottom and the top of the fuel assembly.

More particularly, for lifting (retracting) the control rods, the following steps are accomplished in sequence, beginning with the stationary gripper engaged in a drive rod groove and the moveable gripper and plunger both being deactivated:

1. The moveable gripper is energized and engages the drive rod groove;
2. The stationary gripper is de-energized and disengages from the drive rod;
3. The lift coil is energized and electromagnetically lifts the moveable gripper and the drive rod an elevation equal to the span of the lift plunger;
4. The stationary gripper is energized, re-engages and holds the drive rod (i.e., both grippers are engaged);
5. The moveable gripper is de-energized and disengages the drive rod; and
6. The lift coil is de-energized, dropping the moveable gripper back to its start position, mainly one step lower on the lifted drive rod.

Similarly, for lowering (advancing) the control rods, the following steps are accomplished in sequence, again beginning with only the stationary gripper energized:

1. The lift coil is energized, moving the moveable gripper one step up along the drive rod;
2. The moveable gripper coil is energized and the moveable gripper grips the drive rod;
3. The stationary coil is de-energized, releasing the drive rod;
4. The lift coil is de-energized, dropping the moveable gripper and the drive rod by one step;
5. The stationary coil is energized and the stationary gripper engages the drive rod, at a position one step higher than its previous position; and
6. The moveable coil is de-energized and the moveable gripper disengages from the drive rod.

A number of particular coil mechanisms and gripper mechanisms are possible. Examples of coil jacking mechanisms with a stationary gripper, a moveable gripper and a lifting coil as described heretofore are disclosed, for example, in U.S. Pat. Nos. 5,307,384, 5,066,451, and 5,009,834. In addition, four and five-coil linear drive mechanisms have been employed that operate in a similar manner, such as that described in U.S. Pat. No. 3,959,071.

Whatever mechanical arrangement is employed for the grippers and lifting coil/armature arrangement, a discrete time interval is needed to complete each sequential operation. In order to move the control rods quickly, reliably and efficiently, the respective grippers and coils must be operated accurately as to their timing. This requires that the coil energizing electric power signals to the respective coils be accurately timed.

The power level of coil energization can be simply on and off, or preferably, the coils can be energized at different levels during different operations in the sequence. The coil signals are switched between the levels in a coordinated manner by a logic controller. The logic controller generates timing signals to switch power regulation circuits on and off or between current levels as more fully described in U.S. Pat. No. 5,999,583.

The current rod control system designs for many nuclear power plants were developed during the 1970s. These systems have many single failure mechanisms any one of which can lead to dropped rods. The systems were designed prior to, and do not take advantage of, the capabilities of modern computer-based instrumentation and control equipment. Furthermore, these systems are costly to manufacture and maintain and an improved rod control system that overcomes these and other limitations is needed. Preferably, such a rod control system will be flexible enough to adapt to different magnetic jack system designs without significant re-engineering. Furthermore, such a system should be capable of being retrofitted to existing magnetic jack mechanisms.

SUMMARY OF THE INVENTION

These and other objects are achieved by the nuclear control rod control system of this invention which controls the movement of a plurality of drive rod drive systems, each associated with a control rod assembly, at least some of which have a lift coil, a moveable gripper and a stationary gripper. The nuclear control rod control system of this invention includes a moving unit for controlling multiplexed electrical power to the lift coils of the plurality of the control rod assembly drive rod drive systems. In addition, the nuclear control rod control system of this invention further includes a plurality of selecting units for respectively receiving the electrical power from the moving unit and communicating the electrical power from the moving unit to the corresponding lift coils of the corresponding control rod drive systems. These respective selecting units further receive electrical power from an electrical power source through a corresponding first power control module and selectively communicate the electrical power from the corresponding first power control module to corresponding moveable grippers of the corresponding control rod drive systems. The respective selecting units further respectively receive electrical power from the electrical power source through a corresponding second power control module and selectively communicate the electrical power from the corresponding second power control module to corresponding stationary grippers of the corresponding control rod drive systems. The invention further includes a logic unit for coordinating electrical power to the lift coils, the moveable grippers and the stationary grippers of the plurality of control rod assembly drive rod drive systems.

In one embodiment, the moving unit controls the lifting coils in at least two selecting units. Desirably, the moving unit, each selecting unit and the logic unit are respectively housed in a separate modular cabinet. Conventionally, the control rod assemblies are arranged in groups with each group comprising a plurality of control rod assemblies and in accordance with one embodiment of this invention each selecting unit controls at least two groups of control rod assemblies. Preferably, the two groups of control rod assemblies are controlled separately by the corresponding selecting unit. Desirably, under normal reactor operation, the control rod assemblies in each group move together with each group of control rod assemblies comprising at least four control rod assemblies. Furthermore, in accordance herewith, under normal operation, the control rod assemblies in each group move together and the moveable grippers in each control rod drive system within a given group, the stationary grippers in each control drive system within the given group and the lift coil in each control rod guide system within the given group are respectively controlled in parallel. In the latter case, the moveable grippers and the stationary grippers in each of the control rod assemblies are activated by corresponding electromagnetic coils and in one embodiment include a current regulator controller for monitoring the current in each of the respective electromagnetic gripper coils and the lift coils and control the current supplied to the coils based on the monitored current. Preferably, the current regulator controller captures current profile data for each coil and analyzes the current profile data for proper control rod assembly drive rod drive system operation. Desirably, the current regulator controller uses the analysis of the current profile data to stop drive rod motion if the corresponding control rod assembly drive rod drive system is not operating correctly. In such a system, the current regulator monitors a number of parameters selected from the group comprising individual coil currents, coil voltage, motor generator set voltage, and inserted/removed status of at least some of a plurality of printed circuit cards and a status of at least some of a plurality of connectors on each printed circuit card in a corresponding selecting unit.

In another embodiment, each selecting unit is housed in a separate modular cabinet which is partitioned and each group of control rod assemblies is controlled from a separate partition. Preferably, the moving unit includes means for moving each of the control rod assemblies within a given group independently of another of the control rod assemblies within the given group so that the control rod assemblies can be individually tested. Desirably, the selecting units include a fault protection system for monitoring the power output from a given one of the second power control modules to the stationary grippers associated with a given drive rod drive system and further includes an insurance bus connected between the second power control module and the stationary grippers, that is under the control of the fault protection system to connect to another of a second power control modules when the fault protection system identifies a fault in an output of the given one of the second power control module. In one preferred embodiment, the insurance bus connects to another of the second power control modules in another selecting unit when the selecting unit associated with the given one of the second power control modules is taken out of service for maintenance.

In still another embodiment, the selecting units energize the corresponding moveable grippers and the stationary grippers together in the same control rod assembly when the corresponding lift coils are not energized. Preferably, the selecting units respectively include a microprocessor-based electronics card chassis that provides control and monitoring functions within each selecting unit and provides communications with the logic unit and other selecting units and moving units.

BRIEF DESCRIPTION OF THE DRAWINGS

A further understanding of the invention can be gained from the following description of the preferred embodiments when read in conjunction with the accompanying drawings in which.

DESCRIPTION OF THE PREFERRED EMBODIMENTS

Figure 1:
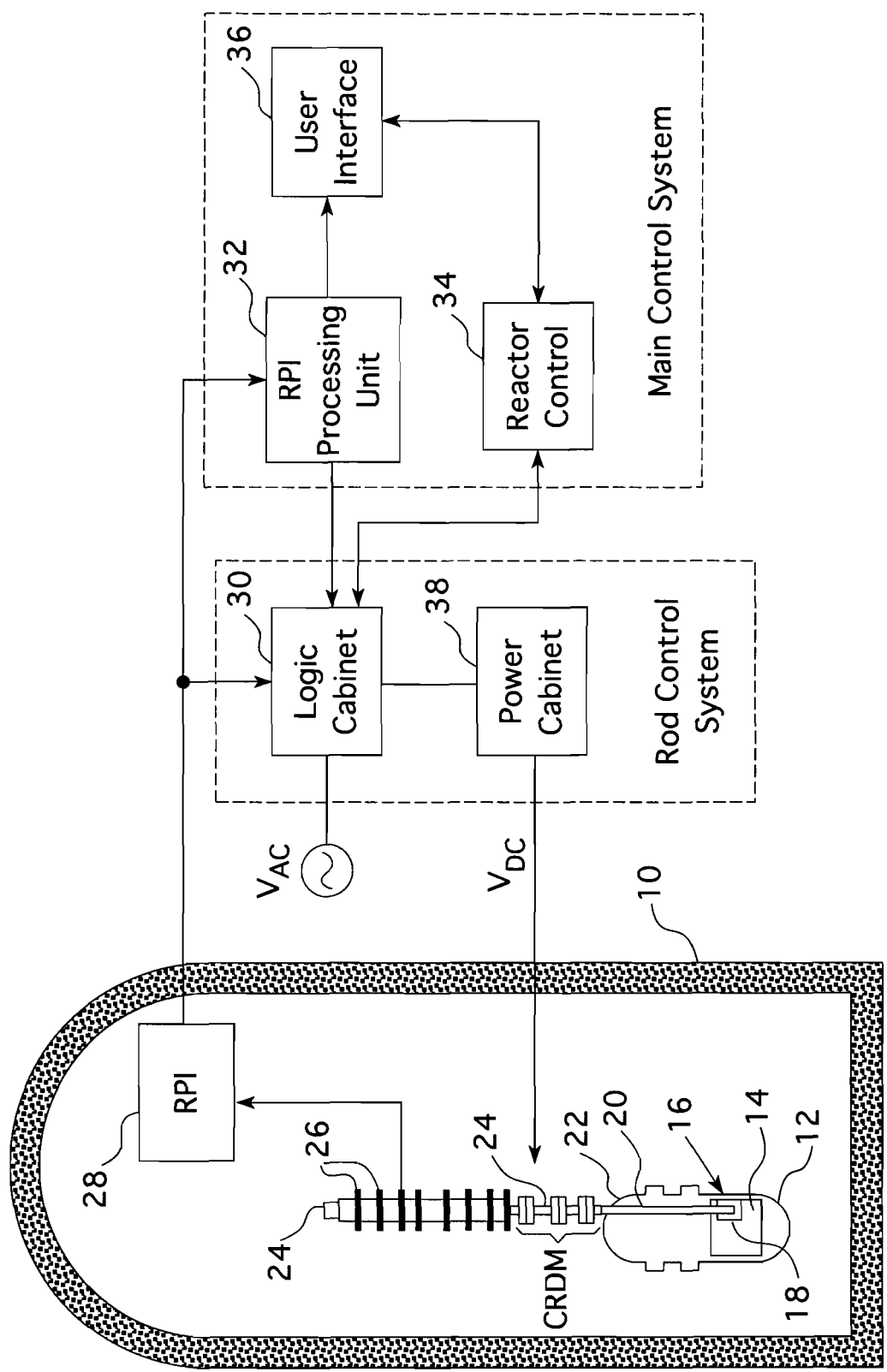
FIG. 1 is a schematic view of a nuclear containment showing an outline of a reactor vessel supporting a control rod drive system for inserting and withdrawing a control rod assembly into and out of the core of the reactor vessel.

The control rods 18 as shown in FIG. 1, are attached in clusters 16, referred to as a control rod assemblies, with each cluster being commonly driven by a drive rod 20 disposed in a vertical support housing 24 above the reactor core 14 containing the fuel rod assemblies into which the control rods 18 are advanced or from which the control rods are retracted for variable damping of nuclear flux within the reactor core. The moving parts of the control rod drive mechanism are within the pressure envelope of the reactor and the electromagnetic coils (CRDM) for driving the moveable parts are disposed around and about each of the housings 24 that extends above the reactor.

Figure 2:
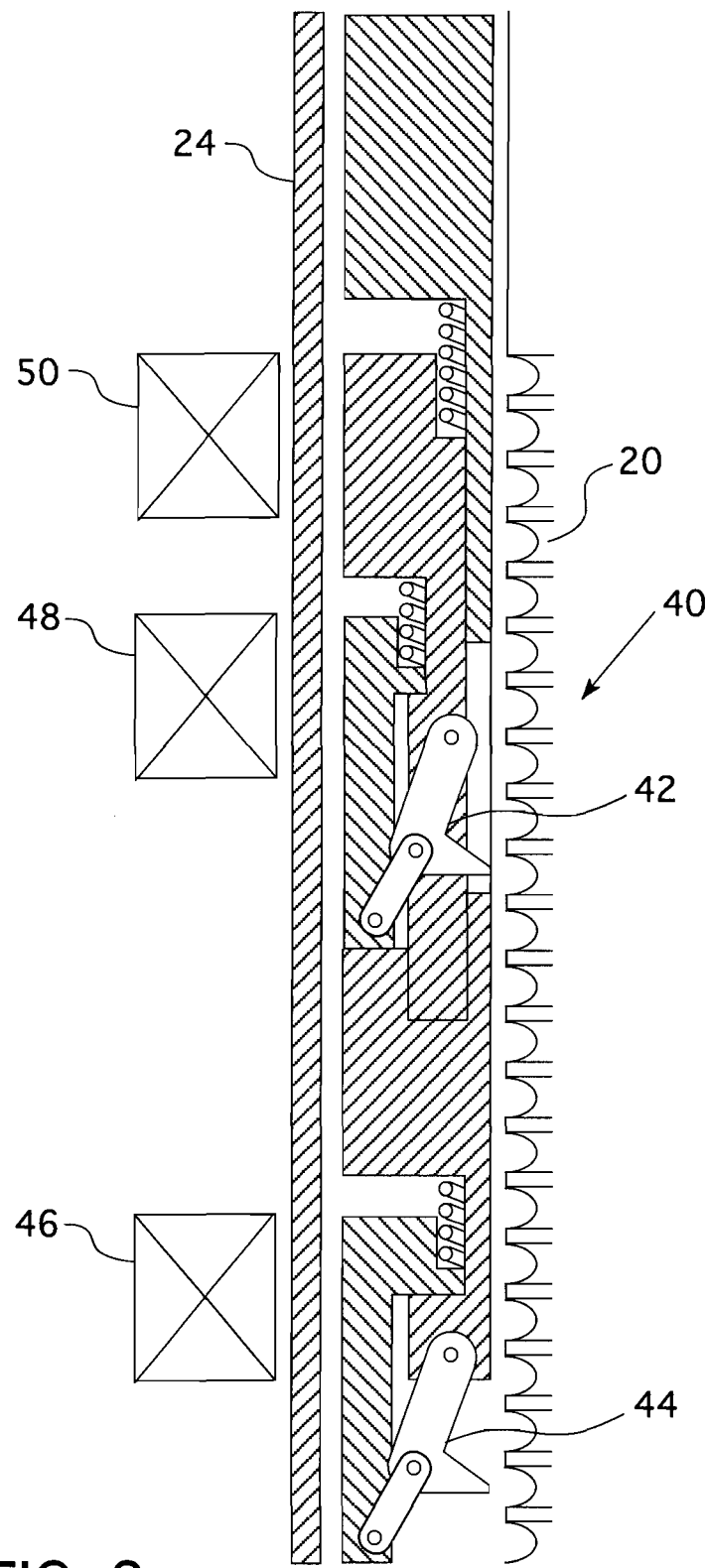
FIG. 2 is an enlarged schematic view of the control rod drive shaft drive system shown in FIG. 1 with a portion cut away to show the internal elements of the drive system.

FIG. 2 shows a drive rod drive mechanism 40 with the extended portion of the housing 24 partly cut away to show the grippers 42 and 44 that are operable in sequences to engage, lift and/or lower the drive rod 20 when the associated coils 46, 48 and 50 of the drive mechanism 40 are energized in a prescribed sequence. This arrangement is substantially as disclosed in U.S. Pat. No. 5,009,834.

The digital rod control system of this invention is a system that functions in conjunction with the nuclear plant instrumentation and control systems 34, as shown in FIG. 1, to insert or withdraw the control rods from the reactor core. A nuclear plant commonly contains a number of control rod assemblies that are arranged into groups; typically, four control rod assemblies per group. Groups of control rod assemblies are usually inserted/withdrawn together to regulate reactor temperature and power. The instrumentation and control system 34 monitors reactor temperature and power and provides signals to the digital rod control system of this invention to demand rod motion, as appropriate. In response to these demand signals, the digital rod control system inserts/withdraws the control rods. Control rod motion is accomplished by cycling the electric power on/off to the various coils 46, 48 and 50 in the control rod drive mechanism 40 (shown in FIG. 2).

The control rod drive mechanism employed with this invention is a magnetic jack mechanism that can move the drive rod 20 of a control rod assembly 16 in fixed increments each time power to the coils is cycled. A spider of control rods 18 is attached to the bottom of a control rod drive rod 20 (sometimes referred to as the drive shaft) so that all the control rods within an assembly move together. The control rod drive mechanism shown in FIG. 2 contains three coils; a stationary gripper coil 46, a moveable gripper coil 48 and a lift coil 50. As mentioned in the previous paragraph, by cycling electrical power to these coils on and off in different sequences, the control rod drive mechanism 40 can cause the control rod drive shaft 20 and the control rods 16 to insert into or withdraw from the core.

The digital rod control system of this invention provides pulsed power to the CRDM coils 46, 48 and 50 shown in FIG. 2 to provide the control rod motion demanded by the plant instrumentation and control system. The CRDM coil power is derived from a parallel set of motor generator sets that provide three phase power to the digital rod control system power cabinets. The digital rod control system power cabinets convert this three-phase power into pulsed power as needed to cycle the CRDMs and provide the demanded rod motion.

Figure 3:
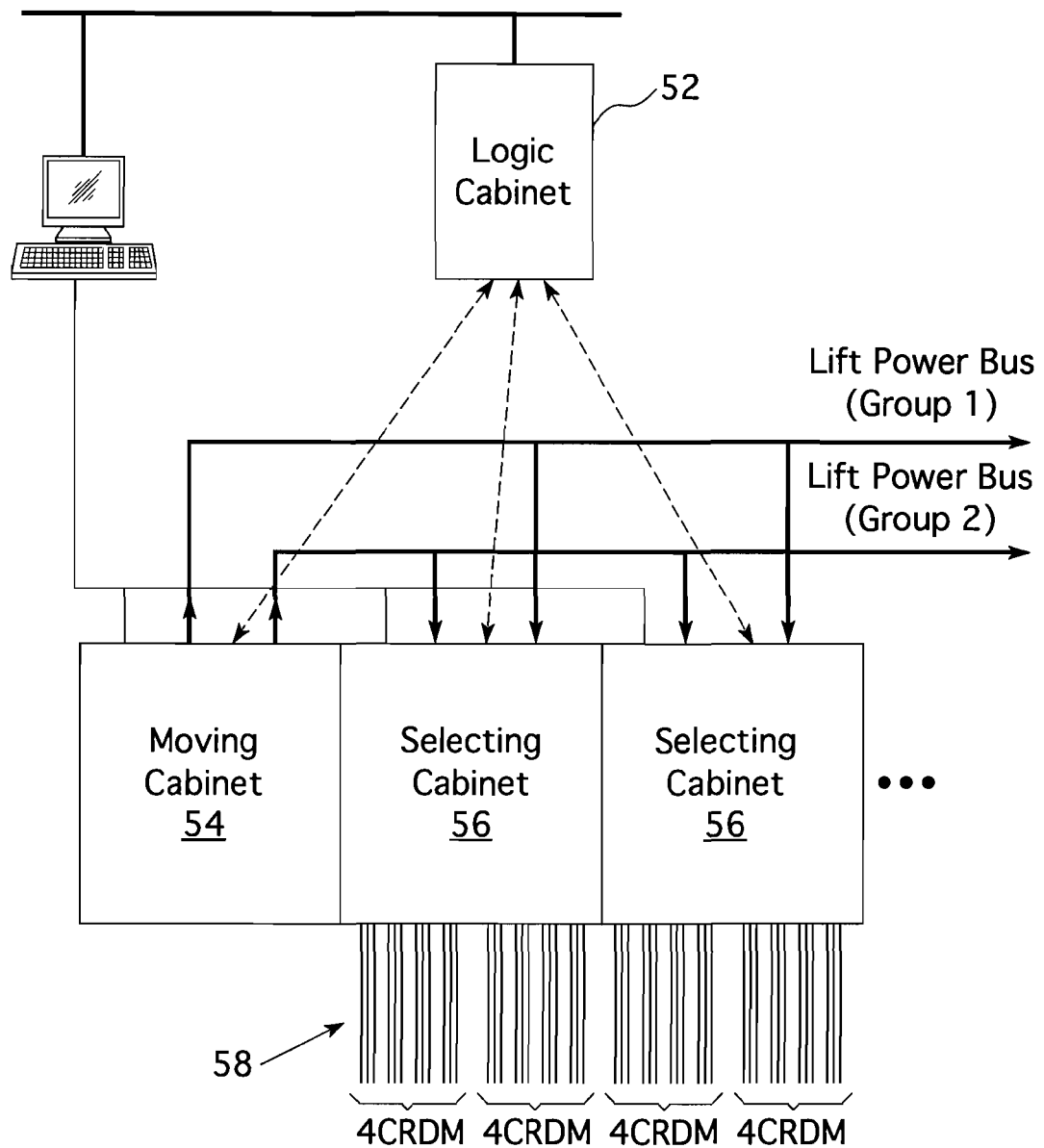
FIG. 3 is a block schematic diagram of the control system of this invention for controlling the drive rod drive system shown in FIG. 2.

FIG. 3 depicts the architecture for a digital rod control system in accordance with one embodiment of this invention. More specifically, FIG. 3 depicts the typical architecture for a digital rod control system for a Westinghouse Nuclear Power Plant employing a three-coil control rod drive mechanism (CRDM). In accordance with the embodiment illustrated in FIG. 3, the digital rod control system of this invention includes one logic cabinet 52, one moving cabinet 54 and two selecting cabinets 56. The moving cabinet and the selecting cabinets may be referred to individually as a "power cabinet" or collectively as "power cabinets." Although the digital rod control system shown in FIG. 3 is illustrated with a specific number of cabinets, it should be apparent to one skilled in the art that additional cabinets may be included as necessary. Additional selecting and moving cabinets, for example, and without limitation, may be included to match the plant configuration for quantity of control rods, grouping of control rods, and number of coils per control rod drive mechanism.

In the embodiment illustrated in FIG. 3, each selecting cabinet 56 provides power to two, four control rod assembly groups (i.e., each group has four drive rods). However, as will be appreciated hereafter, the specific selecting cabinet arrangements may vary according to different plant configurations while remaining within the scope of this invention.

Figure 4:
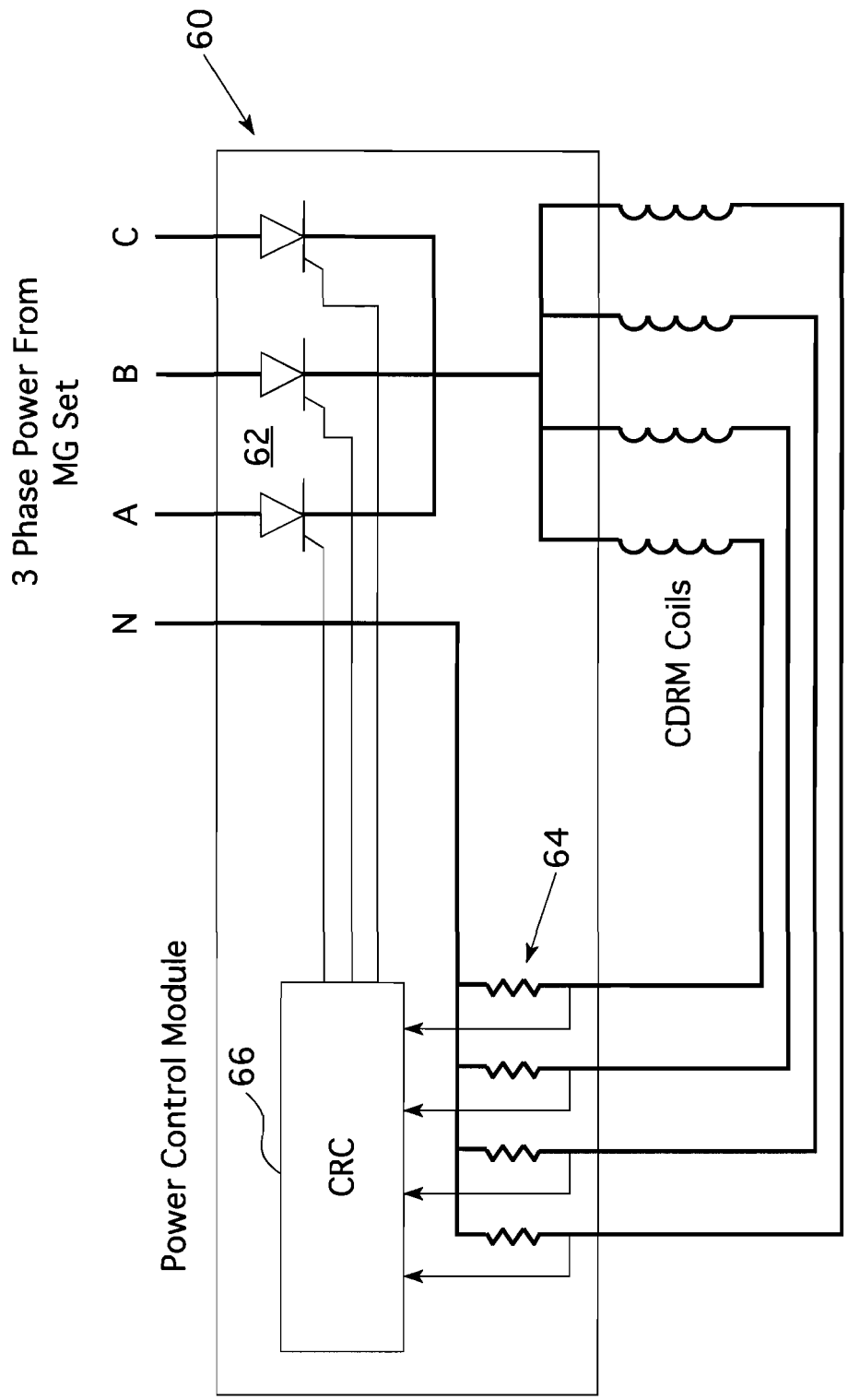
FIG. 4 is a schematic circuitry diagram of the power control modules employed in each of the moving cabinets and selecting cabinets.

In the current embodiment, the digital rod control system uses parallel coil control 58 to control four CRDM coils associated with one four-drive rod group. This parallel coil control is provided from a semiconductor rectifier (SCR) bridge power circuit, a block diagram of which is shown in FIG. 4. The SCR bridge power circuit 60 includes a half-wave SCR bridge rectifier 62, shunt resistors 64 for current monitoring, and a current regulating controller (CRC) 66. The current regulating controller is adapted to monitor the current within the coils and adjusts the SCR firing angle to produce the desired current flow through the CRDM coils. One SCR bridge rectifier 62 provides power to all four coils, (i.e., the corresponding coils in the four control rod drives within a group) as shown in FIG. 4. However, separate shunt resistors 64 are provided for each coil so that the current regulating controller 66 can monitor all four coil currents independently.

One SCR bridge power circuit shown in FIG. 4, is needed for each coil type for each rod group, i.e., one SCR bridge power circuit 60 provides the current for the four stationary grippers in a rod group; one SCR bridge power circuit 60 provides the current for the four moveable grippers in a rod group; and one SCR bridge power circuit 60 provides the currents for the four lift coils in a rod group.

Figure 7:
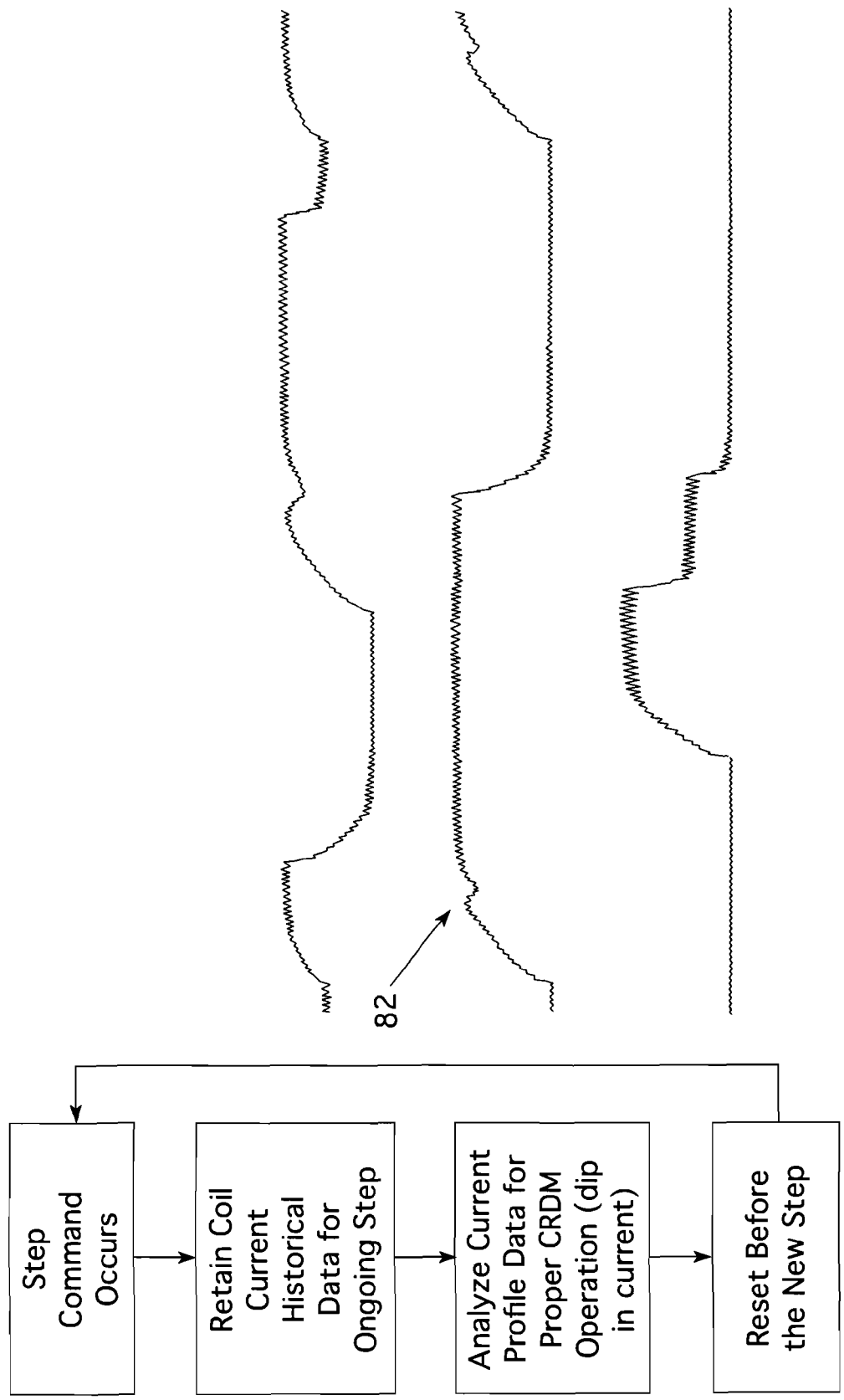
FIG. 7 is a process flow diagram and graphical representation that shows how the current regulating controller monitors successful gripper operation.

The microcontroller in the current regulating controller 66 within the respective power control modules 60, shown in more detail in FIG. 4, captures current profile data for each coil such as that shown in FIG. 7. The CRC 66 analyzes the current profile data for proper CRDM operation. More specifically, the CRC monitors the current in each coil for a dip in current 82 indicating successful gripper operation. The CRC uses the results of this analysis to interrupt the rod motion if the CRDM is not operating correctly. This prevents potential dropped rods. The CRC transmits the current profile information over a high speed network to an application server. The application server displays the current profile trace information to an operator for analysis and archives the data for future reference.

Figure 5:
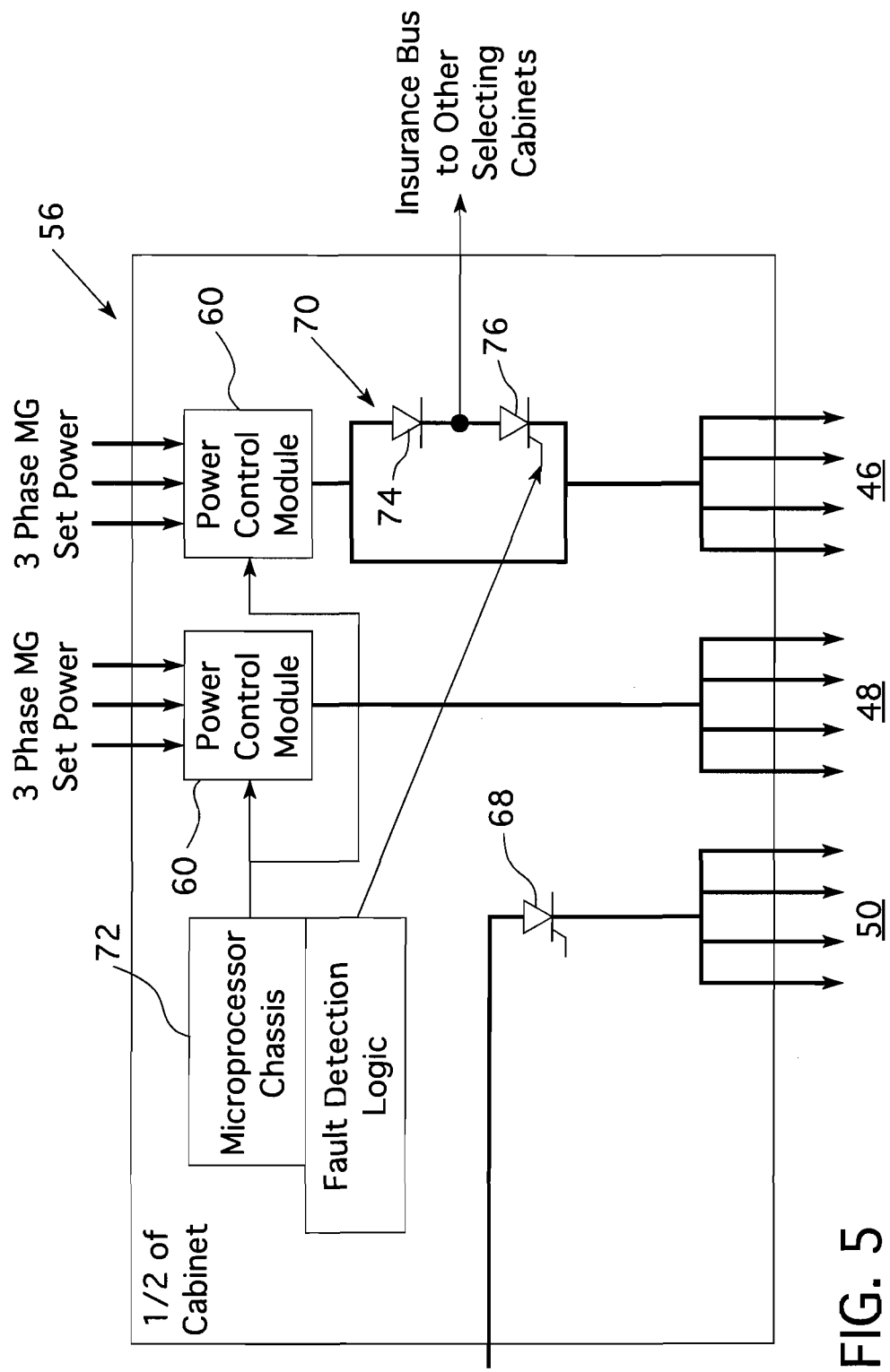
FIG. 5 is a schematic block diagram of the selecting cabinet circuitry.

FIG. 5 is a block diagram of the selecting cabinet 56 of the digital rod control system illustrated in FIG. 1 according to one embodiment of the present invention that employs a three-coil CRDM. More specifically, FIG. 5 illustrates the typical architecture for a selecting cabinet applicable to a Westinghouse Nuclear Power plant design. As shown in FIG. 5, the selecting cabinets include the SCR bridge power control modules 60 and controller electronics 72 for the stationary gripper (SG) and moveable gripper (MG) CRDM coils. The stationary and moveable grippers 44 and 42, respectively, are used for rod motion and to hold the rods in place when no rod motion is under way. Each selecting cabinet 56 includes a front and rear section that are partitioned from one another such that two groups of holding coils can be controlled from one selecting cabinet (one group from the front of the cabinet and one group from the rear of the cabinet). FIG. 5 illustrates one such partition in half of the cabinet, though it should be appreciated that both halves of the cabinet contain identical components for the separate groups. In the current embodiment, each half of the selecting cabinet includes two SCR bridge power circuits 60, multiplex SCRs 68, an insurance bus circuit 70 and a microprocessor based electronics card chassis 72.

The SCR bridge power circuits 60, respectively, provide coil power for the SG coils 46 and for the MG coils 48. The digital rod control system of this invention supports a double hold feature which provides for holding the rods in place with both the SGs and MGs associated with a rod group. The double hold feature prevents many types of single failures, when the rods are not moving, from leading to a dropped rod since there are two grippers normally holding the rods in place. The application of the double hold feature is controlled by the system software. Energizing the MG coil when no rod motion is under way provides the double hold feature.

The multiplex SCRs 68 are turned on to allow power from the moving cabinet 54 to flow through the CRDM lift coils 50 during rod motion. The multiplex SCRs allow lift coil power from one moving cabinet to be used in multiple selecting cabinets 56.

An insurance bus 70 supplies holding power to the SG 46 in the event of a failure of the SCR bridge power control circuit 60 associated with the stationary gripper 46. The insurance bus 70 receives power from other stationary SCR bridges such as the SCR bridge on the other side of the cabinet, by way of a diode 74 and the SCR 76. If a failure occurs in a single stationary bridge circuit 60, the insurance bus SCR 76 associated with the failed stationary power bridge circuit 60 is turned on in order to power the SG coils from the insurance bus, which effectively provides power from another stationary bridge circuit. This insurance bus circuit also acts as a maintenance hold circuit to allow the SG to be held latched from the insurance bus if maintenance needs to be performed within this cabinet. In addition, the insurance bus is used during single rod motion for a four-coil magnetic jack control rod drive system to hold an upper gripper coil energized for rods in a group that are not to be moved. A microprocessor based electronics card chassis 72 provides control and monitoring functions within the cabinet and provides communications with the logic cabinet 52 and the other power cabinets 54 and 56. In that regard, the microprocessor based electronics card chassis monitors the power control modules 60 and upon the identification of a fault turns on the insurance bus SCR 76.

Figure 6:
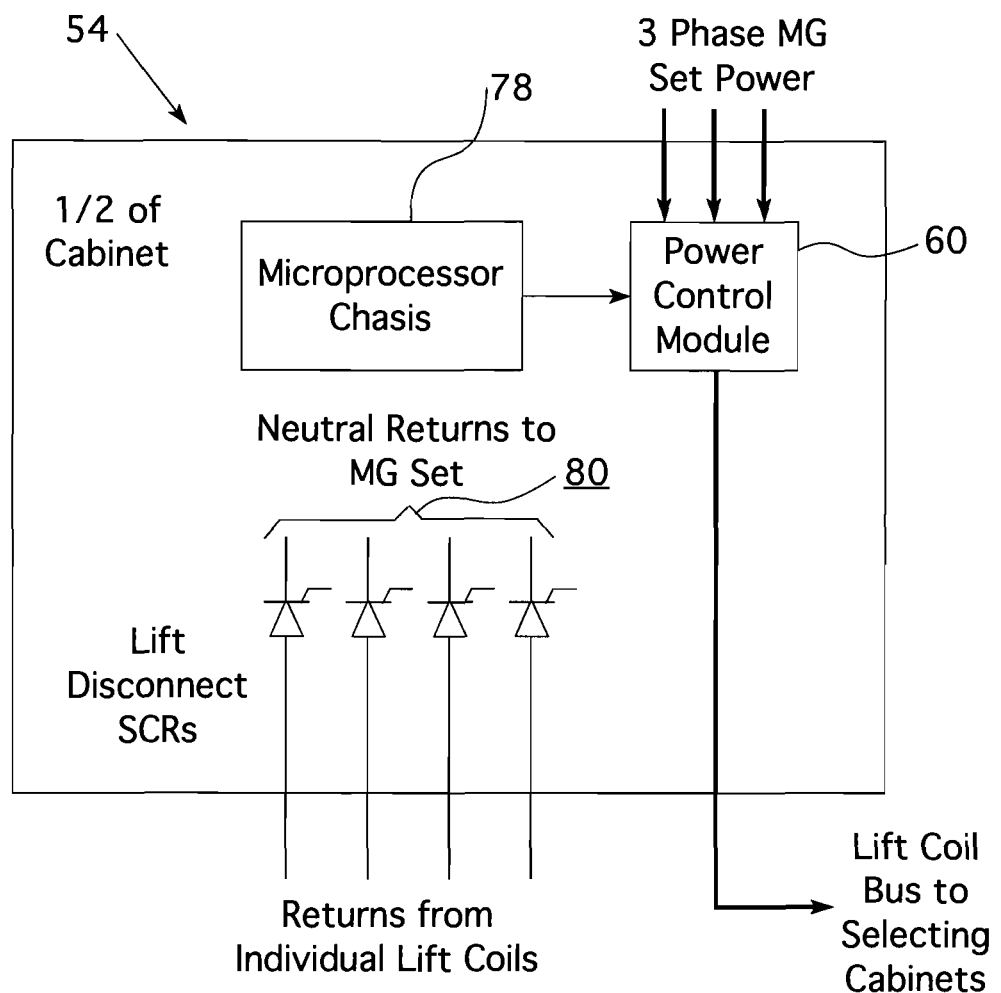
FIG. 6 is schematic block diagram of the moving cabinet circuitry.

FIG. 6 is a block diagram of one half of a moving cabinet 54 of the digital rod control system illustrated in FIG. 3. Moving cabinets 54 provide power for the CRDM lift coils that are only used during rod motion. The power from the moving cabinets can be used to support rod motion for multiple rod groups. However, each moving cabinet SCR bridge 60 can provide power to only one group of CRDM lift coils at one time. Since all plant configurations include overlap motion of control banks and rod banks consisting of two or more groups, multiple moving cabinets are required. Parallel coil control is provided from one SCR bridge power circuit 60 to control four CRDM lift coils associated with one rod group. As in the case of the selecting cabinets each moving cabinet has a front and a rear section such that two coil sets of four CRDM lift coils can be controlled from one moving cabinet. As shown in FIG. 6, moving cabinets include the SCR bridges and control electronics for the lift coils. In that regard, each half of the moving cabinets includes an SCR bridge power circuit 60, a microprocessor based electronics card chassis 78 and lift disconnect SCRs 80. The SCR bridge power circuits 60 are adapted to provide coil power for the lift coil. One bridge is located in the cabinet front and one bridge is located in the cabinet rear, respectively, to provide power for the lift coils of each group.

The lift disconnect SCRs 80 are interposed between the neutral returns to the motor generator set and the returns from the individual lift coils to support single rod motion. With the use of parallel coil control, all four rods within a group are operated in parallel. The lift disconnect SCRs 80 allow the operation of a single rod when needed by disconnecting the lift coils for all rods in the group except for the rod to be moved. The microprocessor based electronics card chassis 78 provides control and monitoring functions within the cabinet 54 and provides communications with the logic cabinet 52 and the other power cabinets 54 and 56.

Figure 8:
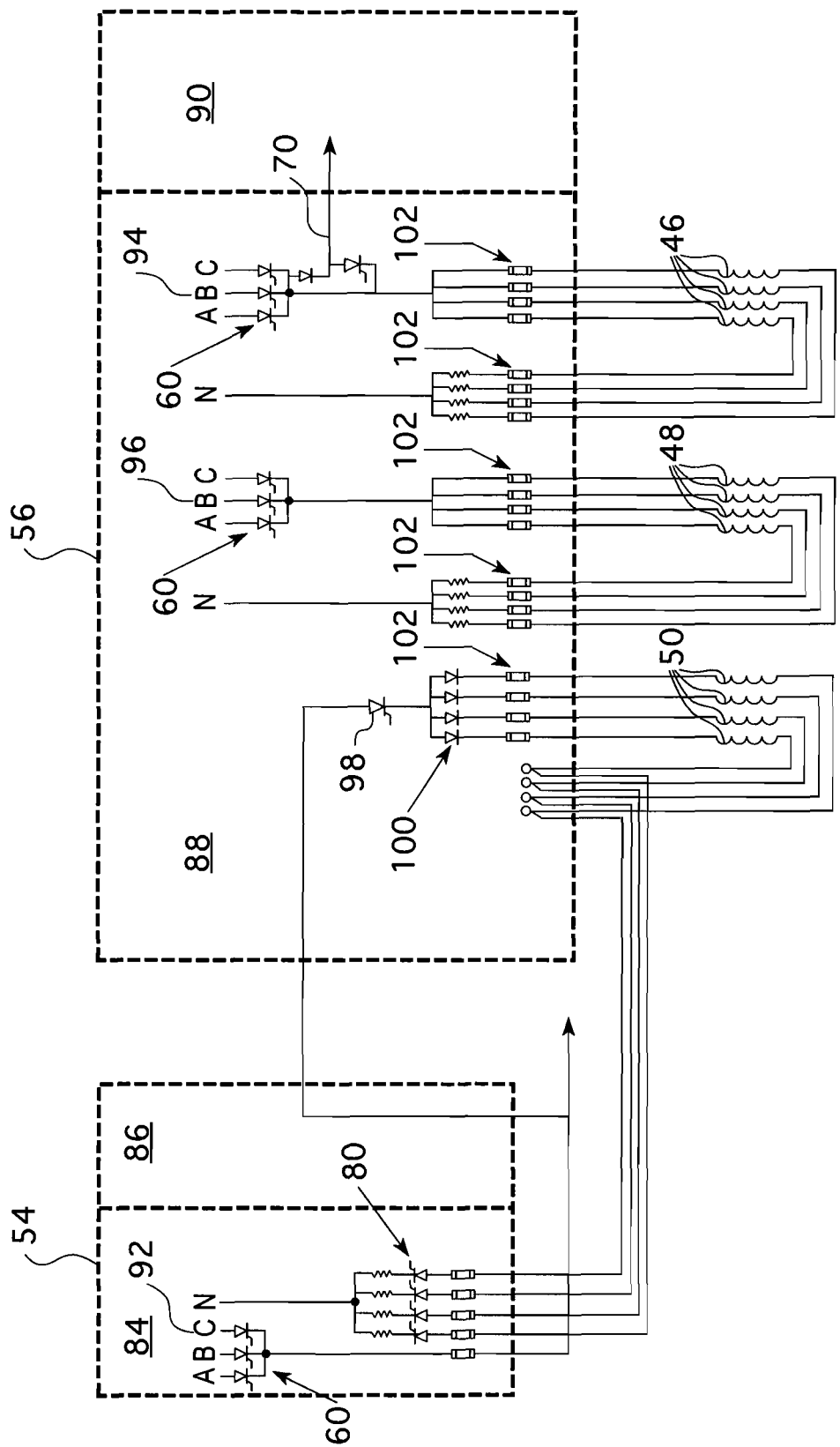
FIG. 8 is a schematic circuitry diagram of a three-coil control rod drive rod drive system showing the interconnection of the moving cabinet with a selecting cabinet.

FIG. 8 depicts the power cabinet architecture for a three-coil control rod drive mechanism magnetic jack system. One moving cabinet 54 (front 84 and rear 86) is shown. One selecting cabinet 56 (front 88 and rear 90) is shown. The front and rear sections of the moving and selecting cabinets are identical. Each section (front 84 and rear 86) of the moving cabinet 54 contains control electronics for a set of four lift coils 50. In addition, each section (front 88 and rear 90) of the selecting cabinet 56 contains control electronics for a set of four stationary gripper coils 46 and for a set of four movable gripper coils 48. In order to move a group of four rods, a moving cabinet 54 is used to provide lift coil power through a lift coil SCR bridge 92 and a selecting cabinet 56 is used to provide stationary gripper and moveable gripper power, respectively, through the stationary gripper SCR bridge 94 and the moveable gripper SCR bridge 96. A multiplex SCR 98 in the selecting cabinet 56 switches on to allow power from the moving cabinet to flow to the lift coils 50 for the selected rod group. The lift coil control power is provided through blocking diodes 100 which are required to prevent unwanted current flow through the lift coils in other rod groups during single rod motion. Each of the current paths is provided with one or more fuses 102, to protect the circuitry and the lift coil 50 return power flows through lift disconnect SCRs 80 which provide support for a single rod motion. The insurance bus 70 runs between the front and rear of each selecting cabinet. Preferably, the insurance bus 70 does not run between selecting cabinets to allow for the insurance bus to be actuated in multiple selecting cabinets simultaneously without risk of overloading the insurance bus circuitry. However, with the proper circuitry precautions, the insurance bus can run between selecting cabinets.

Figure 9:
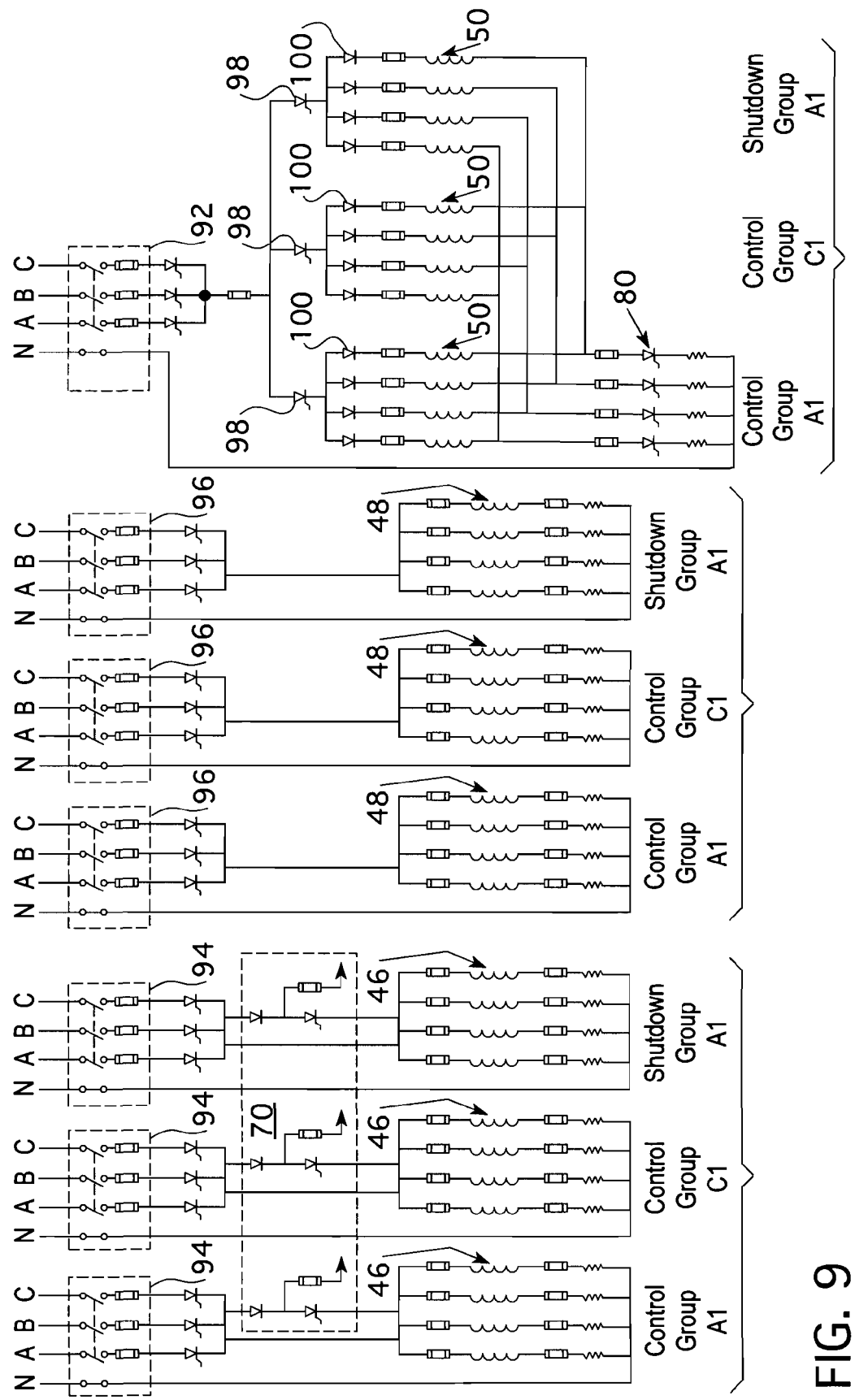
FIG. 9 is a schematic circuitry diagram of the details of the three-coiled power cabinet circuitry.

FIG. 9 depicts power circuit diagrams for all power cabinets associated with a typical set of three rod groups for a Westinghouse design. Selecting and moving cabinet assignments are not shown, because this would unnecessarily complicate the figure. The rod groups are assigned to power cabinet sets such that no more than one rod group in the set will ever be moved simultaneously. Rod groups are shown for a typical Westinghouse three loop plant. From FIG. 9 one can better appreciate that the blocking diodes 100 prevent unwanted current flow through the lift coils in other rod groups during single rod motion.

Figure 10:
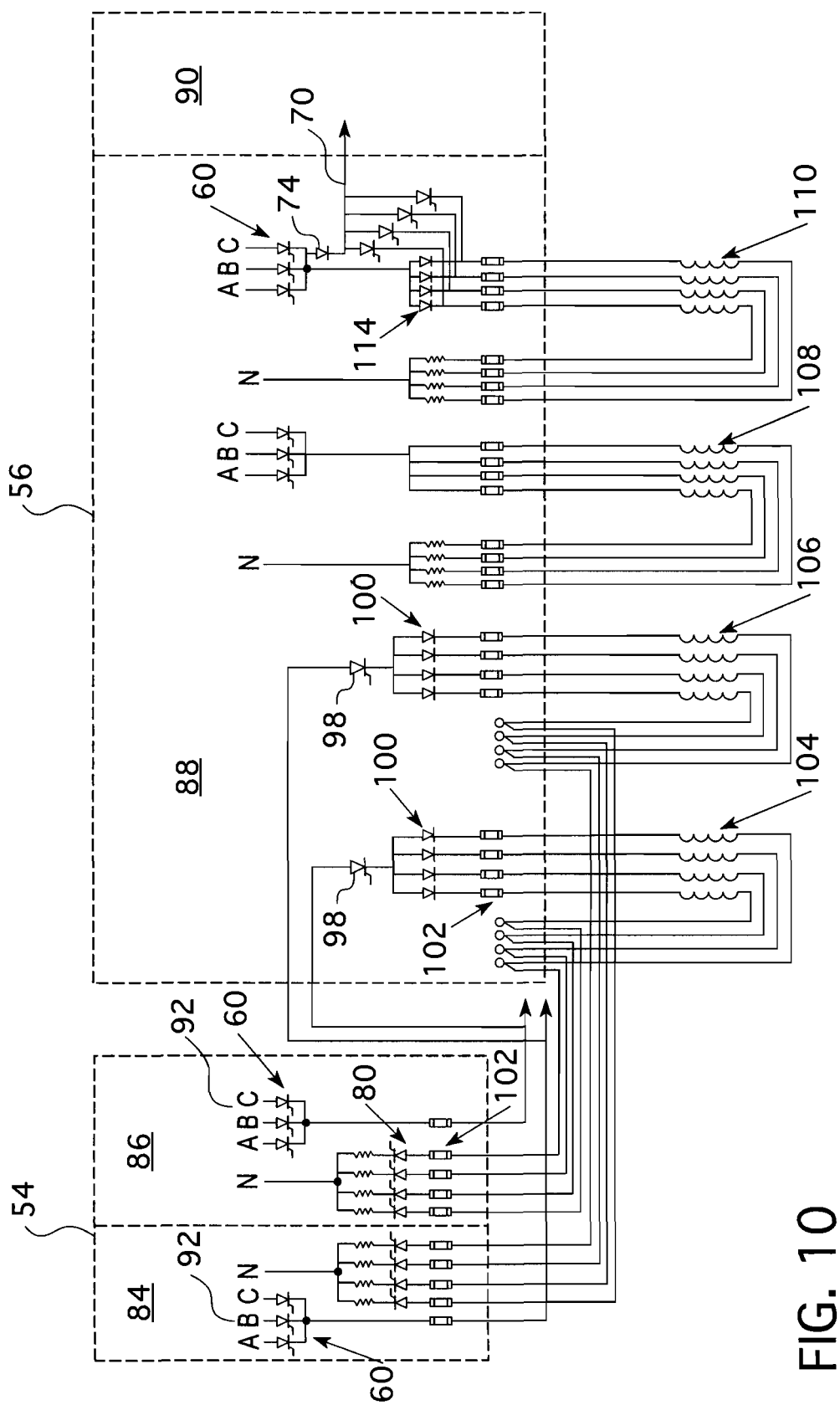
FIG. 10 is a schematic circuitry diagram of the drive rod control system power cabinet architecture for a four-coil control rod drive rod magnetic jack drive system.

FIG. 10 depicts the power cabinet architecture for another embodiment of this invention for a four-coil control rod drive rod drive system design. One moving cabinet 54 (front 84 and rear 86) is shown. One selecting cabinet 56 (front 88 and rear 90) is also shown herein. The front 88 and rear 90 sections of a selecting cabinet 56 are identical. The rear 90 of the selecting cabinet contains the same circuitry as the front 88 of the cabinet and provides control for another group of four rods. The moving cabinet 54 is divided into front 84 and rear 86 sections. The front 84 contains control electronics for a set of four lower lift coils 106. The rear 86 contains control electronics for a set of four upper lift coils 104. In order to move a group of four rods, a moving cabinet is used to provide lower lift and upper lift coil power and a selecting cabinet is used to provide upper gripper and lower gripper power. Multiplex SCRs 98, in the selecting cabinet 56, switch on to allow power from the moving cabinet to flow through the lower lift 106 and upper lift 104 coils for the selected rod group. The upper lift and lower lift 104 and 106 coils control power is provided through blocking diodes 100 to prevent unwanted current flow through the lift coils in other rod groups during single rod motion as was described before. Similarly, upper lift and lower lift coils' 104 and 106 return power flows through lift disconnect SCRs 80 which support single rod motion. The insurance bus 70 runs between the front and rear of each selecting cabinet 56 as previously described. In the four-coil design, the insurance bus 70 is implemented on an individual coil 110 basis rather than one bus for all the upper gripper coils as in the three-coil design. This is required to support single rod motion. Both grippers are capable of moving in the four-coil design. If single rod motion were implemented as it is in the three-coil design, the two grippers would ultimately hold the rod with no lift coil power for the rods that are not moving. This would result in slowly ratcheting insertion of the rod due to the alignment of the two grippers with the notches in the drive shaft. To hold the rods in place, the insurance bus will be actuated for the rods not to be moved. This will maintain the upper gripper 110 energized continuously for the rods in the group that are not being moved. Additionally, blocking diodes 114 are provided in series with the upper gripper coils 110. These diodes prevent insurance bus current from flowing through the upper gripper coil that is actually being cycled on/off during single rod motion.

Figure 11:
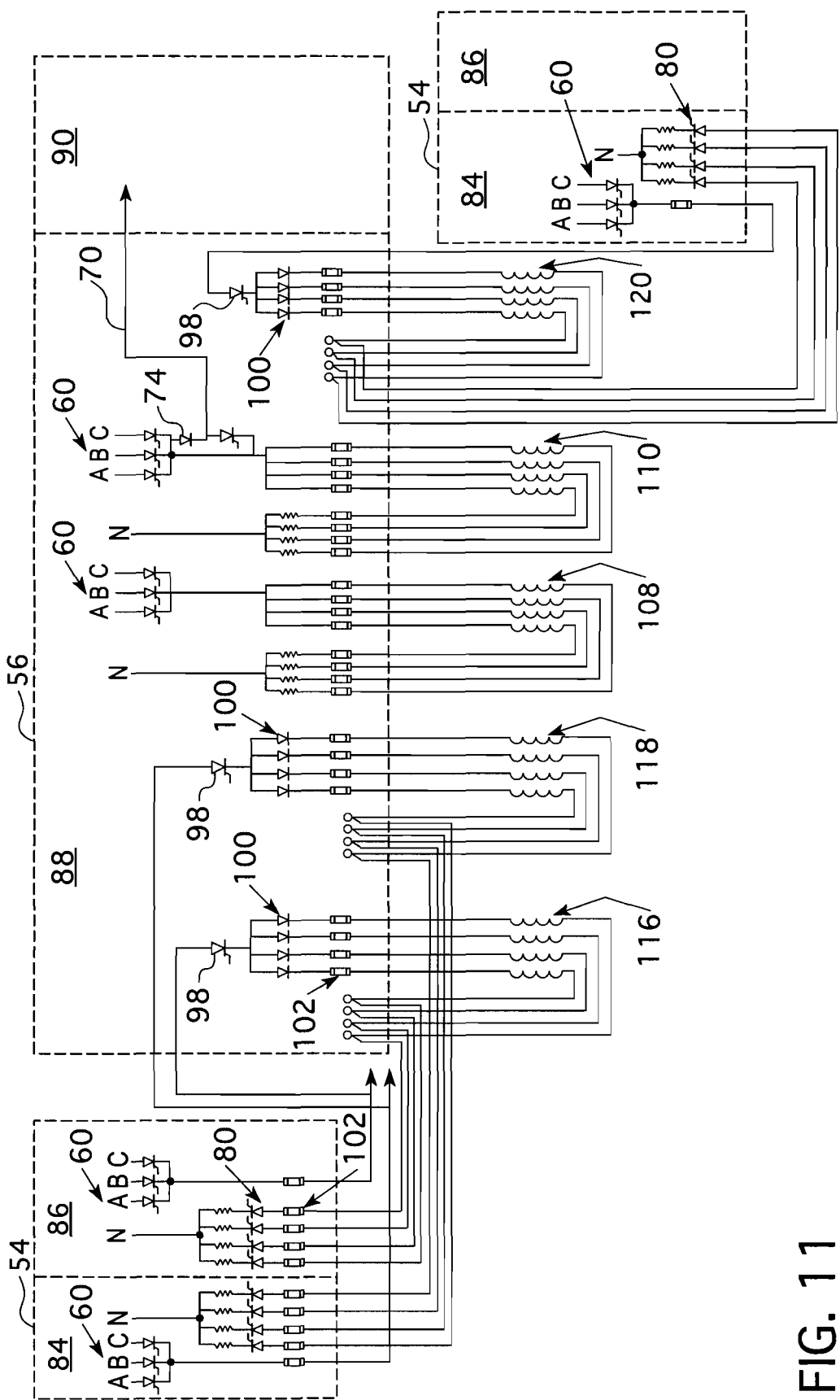
FIG. 11 is a schematic circuitry diagram of the power cabinet architecture for a five-coil control rod drive rod magnetic jack drive system.

FIG. 11 depicts the power cabinet architecture for a five-coil magnetic jack design. A moving cabinet 54 (front 84 and rear 86) is shown in the upper left-hand corner of FIG. 11 for supplying power to both the lift 116 and load transfer 118 coils. A second moving cabinet 54 (front 84 and rear 86) is shown in the lower right-hand corner for powering the pull-down coils 120. One selecting cabinet 56 (front 88 and rear 90) is shown on the upper right side of FIG. 11. The front 88 and rear 90 sections of the selecting cabinet 56 are identical. The rear of the selecting cabinet contains the same circuitry as the front of the cabinet and provides control for another group of four rods.

Two moving cabinets 54 are needed for controlling one rod group in the five-coil magnetic jack arrangement. Each moving cabinet 54 is divided into a front 84 and rear 86 section. The first moving cabinet 54 in the upper left-hand portion of FIG. 11 controls the load transfer 118 and the lift 116 coils. The front of this first moving cabinet 54 includes the control electronics for a set of four load transfer coils 118. The rear section 86 includes control electronics for a set of four lift coils 116. The second moving cabinet 54 in the lower right-hand portion of the figure controls the pull-down coil 120. Only one-half of this latter moving cabinet (either the front 84 or the rear 86) is needed for each rod group. Therefore, in order to move a group of four rods, a moving cabinet is used to provide load transfer coil and lift coil power; a half of another moving cabinet is used to provide pull-down coil power; and a selecting cabinet is used to provide upper gripper and lower gripper coil power. Multiplex SCRs 98 in the selecting cabinet switch on to allow power from the moving cabinets to flow to the load transfer, pull-down and lift coils for the selected rod group. As was the case in the previously discussed magnetic jack arrangements, in this case, the load transfer, pull-down and lift coil control power is provided through blocking diodes 100 to prevent unwanted current flow through lift, pull-down and load transfer coils in other rod groups during single rod motion. The load transfer, pull-down and lift coils' return power flows through corresponding disconnect SCRs 80 to support single rod motion. The insurance bus 70 runs between the front and rear of each selecting cabinet 56. The insurance bus is implemented on one bus for all upper gripper coils 110 in a selecting cabinet as is the case for the three-coil design, and the insurance bus circuit supplies holding power for the upper gripper coils in the event of a failure in the SCR bridge power circuit 60. The insurance bus preferably receives power from the opposite side of the selecting cabinet upper gripper SCR bridge by way of diode 74. If a failure occurs in a single upper gripper bridge circuit, the insurance bus SCR is turned on to power the upper gripper coils from the insurance bus, which effectively provides power from another upper gripper bridge circuit. This insurance bus circuit also acts as a maintenance hold circuit to allow the upper gripper to be held latched from the insurance bus if maintenance needs to be performed within this cabinet. For single rod motion, the insurance bus is not actuated, and the two grippers alternately hold the rod with no load transfer, pull-down or lift coil power for rods that are not moving.

The current regulating controller 66, which is part of the corresponding power control module 60, previously described with regard to FIG. 4, also monitors aspects of power cabinet operation and makes information available over a high speed network to a data link server. The information monitored includes, without limitation, individual coil currents, coil voltage, motor generator set voltage, the inserted/removed status of all printed circuit cards in the system, and the inserted/removed status of each connector on each printed circuit card. The power cabinet status information monitored is made available remotely for operator information.

In accordance with this invention, by providing independent power control units, i.e., power modules 60, for the separate grippers, a double gripper holding feature can be implemented to avoid dropped rods. If the circuits providing current to one gripper fails, the system detects the failure through monitoring of the coil currents and the current regulating controller 66 status, and the other gripper associated with the corresponding drive rod is automatically engaged for further protection against dropped rods due to circuit element failures. Additionally, the insurance bus provides fault detection and action if a failure in a stationary gripper's microprocessor control circuit occurs. As shown in FIG. 5, the fault detection logic in the microprocessor chassis 72 monitors the power control module outputs, and actuates the insurance bus SCR 76 if a failure is detected.

The digital rod control system of this invention architecture is modular such that with minor changes, the digital rod control system can be employed with different rod control system designs, for example, and without limitation, a Westinghouse three-coil design, a Combustion Engineering four-coil design, a Combustion Engineering five-coil design, etc. FIG. 8, for instance, depicts the overall power cabinet configuration for three-coil drive mechanism operation according to one embodiment. FIG. 10, for instance, depicts the overall power cabinet configuration for four-coiled drive mechanism operation according to another embodiment. As can be seen from these two examples, the modularity of the design can accommodate multiple plant configurations.

While specific embodiments of the invention have been described in detail, it will be appreciated by those skilled in the art that various modifications and alternatives to those details could be developed in light of the overall teachings of the disclosure. Accordingly, the particular embodiments disclosed are meant to be illustrative only and not limiting as to the scope of the invention, which is to be given the full breadth of the appended claims and any and all equivalents thereof.

What is claimed is:

1. A nuclear control rod control system for controlling the movement of a plurality of drive rod drive system groups, each associated with a plurality of control rod assemblies, at least some of which have a lift coil, a moveable gripper and a stationary gripper comprising:
    a moving unit configured to control multiplexed electrical power to the lift coils of the plurality of the control rod assembly drive rod drive system groups;
    a plurality of selecting units, each associated with one drive rod drive system group and configured to (i) respectively receive the electrical power from the moving unit and communicate the electrical power from the moving unit to the corresponding lift coils of the corresponding control rod drive system group, (ii) respectively receive electrical power from an electrical power source through a corresponding first power control module within the selecting unit and selectively communicate the electrical power from the corresponding first power control module to corresponding moveable grippers of the corresponding control rod drive system group, and (iii) respectively receive electrical power from the electrical power source through a corresponding second power control module within the selecting unit and selectively communicate the electrical power from the corresponding second power control module to corresponding stationary grippers of the corresponding control rod drive system group; and
    a logic unit configured to coordinate electrical power to the lift coils, the moveable grippers and the stationary grippers of the plurality of control rod assembly drive rod drive system groups.

2. The nuclear control rod control system of claim 1 wherein each moving unit controls the lifting coils in at least two selecting units.

3. The nuclear control rod control system of claim 1 wherein the moving unit, and the logic unit are respectively housed in a separate modular cabinet separate from the selecting units.

4. The nuclear control rod control system of claim 3 wherein at least some of the modular cabinets that house selecting units control at least two groups of control rod assemblies.

5. The nuclear control rod control system of claim 4 wherein the two groups of control rod assemblies are controlled separately by the corresponding selecting units.

6. The nuclear control rod control system of claim 4 wherein under normal reactor operation the control rod assemblies in each group move together and wherein each group of control rod assemblies comprises up to four control rod assemblies.

7. The nuclear control rod control system of claim 4 wherein under normal reactor operation the control rod assemblies in each group move together and the moveable grippers in each control rod drive system within a given group, the stationary grippers in each control rod drive system within the given group and the lift coil in each control rod drive system within the given group are respectively controlled in parallel.

8. The nuclear control rod control system of claim 7 wherein the moveable grippers and the stationary grippers in each of the control rod assemblies are activated by corresponding electromagnetic coils and including a current regulator controller within each of the selecting units, configured to monitor the current in each of the respective electromagnetic coils and the lift coils and control the current based on the monitored current.

9. The nuclear control rod control system of claim 8 wherein the current regulator controller captures current profile data for each coil and analyzes the current profile data for proper control rod assembly drive rod drive system operation.

10. The nuclear control rod control system of claim 9 wherein the current regulator controller uses the analysis of the current profile data to stop drive rod motion if the corresponding control rod assembly drive rod drive system is not operating correctly.

11. The nuclear control rod control system of claim 9 wherein the current regulator controller provides for the display of captured current profile data.

12. The nuclear control rod control system of claim 8 wherein the current regulator controller monitors two or more of a number of parameters selected from the group comprising individual coil currents, coil voltage, motor generator set voltage, an inserted/removed status of at least some of a plurality of printed circuit cards and a status of at least some of a plurality of connectors on each printed circuit card on a corresponding selecting unit.

13. The nuclear control rod control system of claim 4 wherein each selecting unit is housed in a separate modular cabinet which is partitioned and each group of control rod assemblies is controlled from a separate partition.

14. The nuclear control rod control system of claim 4 including means for moving each of the control rod assemblies within a given group independently of another of the control rod assemblies within the given group.

15. The nuclear control rod control system of claim 1 including a fault detection system for monitoring the power output from a given one of the second power control modules to the stationary grippers associated with a given drive rod drive system and further including an insurance bus connected between the second power control module and the stationary grippers, that is under the control of the fault detection system to connect to another of the second power control modules when the fault detection system identifies a fault in an output of the given one of the second power control module.

16. The nuclear control rod control system of claim 15 wherein the insurance bus connects to the another of the second power control modules in another selecting unit when the selecting unit associated with the given one of the second power control modules is taken out of service for maintenance.

17. The nuclear control rod control system of claim 1 wherein the selecting units energize the corresponding moveable grippers and the stationary grippers together when the corresponding lift coils are not energized.

18. The nuclear control rod control system of claim 1 wherein the selecting units include a microprocessor-based electronics card chassis that provides control and monitoring functions within each selecting unit and provides communications with the logic unit and other selecting units and moving units.

* * * * *